United States Patent [19]

Shigemura et al.

[11] Patent Number: 5,140,442
[45] Date of Patent: Aug. 18, 1992

[54] IMAGE FORMING APPARATUS HAVING AN ADDITIONAL DATA RECORDING MEANS

[75] Inventors: Yutaka Shigemura, Takarazuka; Takashi Kondo, Sakai; Hideo Umezawa, Amagasaki; Mitsuharu Yoshimoto, Nara; Satoshi Yano, Takatsuki; Yukihiro Ito, Osaka; Junichi Oura, Hirakata; Masanobu Takahashi, Suita, all of Japan

[73] Assignee: Mita Industrial Co., Ltd., Osaka, Japan

[21] Appl. No.: 567,139

[22] Filed: Aug. 14, 1990

[30] Foreign Application Priority Data

Aug. 18, 1989 [JP] Japan .................................. 1-213405
Aug. 18, 1989 [JP] Japan .................................. 1-213406
Aug. 18, 1989 [JP] Japan .................................. 1-213407
Aug. 18, 1989 [JP] Japan .................................. 1-213408

[51] Int. Cl.$^5$ .............................................. H04N 1/24
[52] U.S. Cl. ................................. 358/473; 358/401; 358/445
[58] Field of Search ............... 358/400, 401, 453, 473, 358/445; 382/58, 59, 61; 235/472

[56] References Cited

U.S. PATENT DOCUMENTS

| | | | |
|---|---|---|---|
| 4,408,181 | 10/1983 | Nakayama | 382/61 |
| 4,679,096 | 7/1987 | Nagashima | 382/59 |
| 4,706,606 | 7/1988 | Lesnick et al. | 382/61 |
| 4,707,747 | 11/1987 | Rockwell, III | 358/473 |
| 4,760,608 | 7/1988 | Suzuki | 382/61 |
| 4,963,996 | 10/1990 | Bannai | 382/61 |
| 5,027,421 | 6/1991 | Kanno | 382/61 |

OTHER PUBLICATIONS

Japanese Patent Laid-Open Gazette No. 258575/1985.
Japanese Patent Laid-Open Gazette No. 53665/1986.

Primary Examiner—Jose L. Couso
Attorney, Agent, or Firm—Beveridge, DeGrandi & Weilacher

[57] ABSTRACT

An image forming apparatus can be achieved as, for example, a copying machine. The copying machine according to the present invention includes a handy scanner provided detachably from the main body of the copy machine and an additional data recording device for recording data read by the handy scanner as additonal data in addition to a mechanism for reading an image of a document disposed on an original glass plate to copy the same onto recording paper. The handy scanner can read arbitrary image data such as a figure, a designed character or a logotype. The image data read by the handy scanner is applied to the additional data recording device. If the paper on which the document image has been copied is provided to the additional data recording device, the additional data recording device records the additonal data at the rear of the paper on which the document image has been copied. The additional data recording device is operated after the document image is copied, the paper being conveyed at a speed different from that at the time of copying the document image.

12 Claims, 11 Drawing Sheets

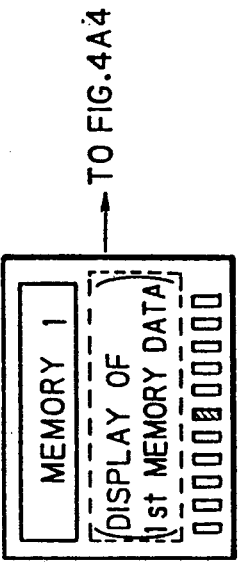
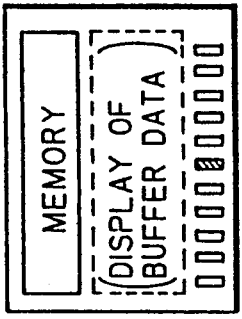
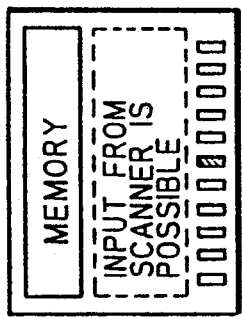
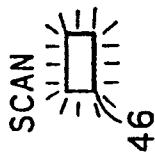
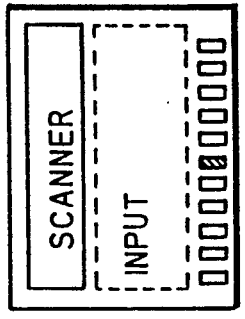
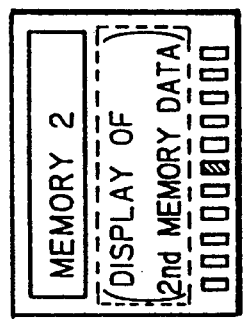
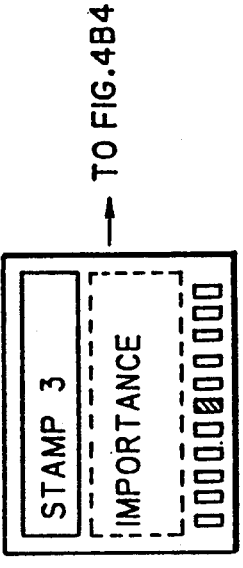
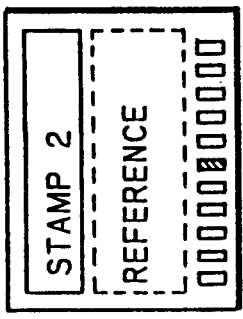
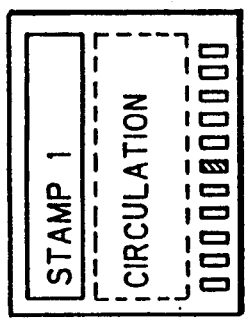
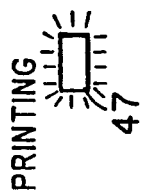

FIG.4B6  STAMP 6  INHIBITION OF COPY  → TO FIG.4B1
FIG.4B5  STAMP 5  SECRET OUTSIDE COMPANY
FIG.4C2  DATE 2  平成01年08月01日  → TO FIG.4C1
FIG.4B4  STAMP 4  URGENT CIRCURATION
FIG.4C1  DATE 1  89/08/01
FIG.4D1  100%  COPYING IS POSSIBLE; AUTOMATIC SELECTION OF PAPER
FIG.4C  FUNCTION 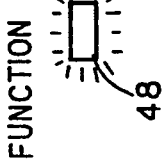 48
FIG.4D  NORMAL 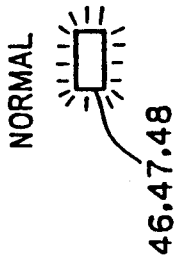 46,47,48

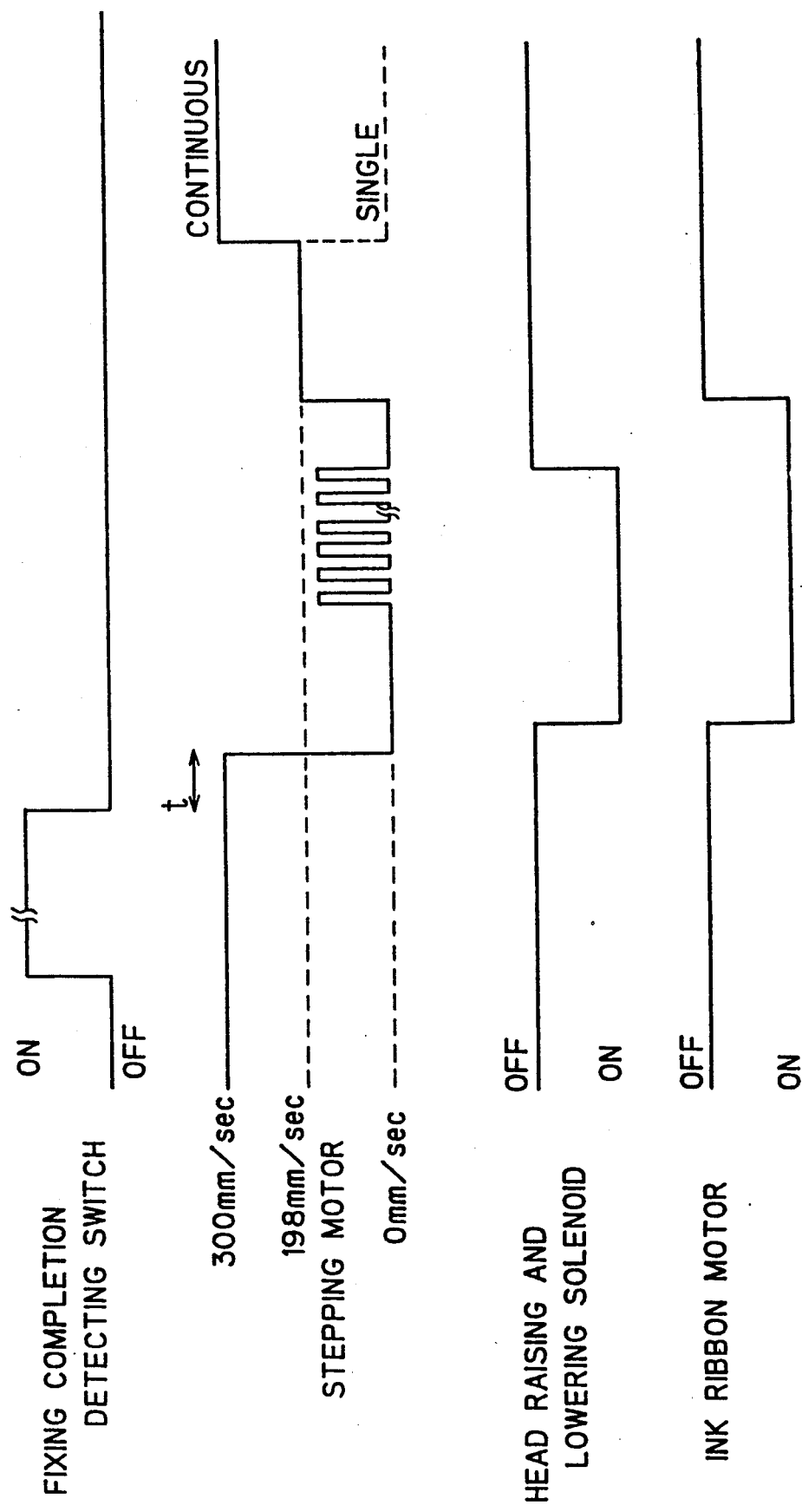

IMAGE FORMING APPARATUS HAVING AN ADDITIONAL DATA RECORDING MEANS

BACKGROUND OF THE INVENTION

1. Field of the Invention

The present invention relates generally to image forming apparatuses such as a copying machine, a printer or a facsimile, and more particularly, to an image forming apparatus capable of recording additional information such as desired characters or marks in addition to a document image.

2. Description of the Prior Art

For example, copying machines conventionally known comprise one capable of recording additional information such as the date and the name of a company in addition to an inherent document image (see Japanese Patent Laid-Open Gazette Nos. 258575/1985 and 53665/1986).

The conventional copying machine capable of recording additional information uses a variety of keys of an operation panel so as to input additional information. In addition, it is so constructed that a plurality of additional information is previously stored in a memory and desired additional information is called by a function key or the like of the operation panel.

In a system of inputting additional information and calling additional information in a memory by a key operation, however, only particular additional information such as numerals and characters can be inputted and desired additional information is only selected from additional information previously stored. Accordingly, it is impossible to input a figure having an arbitrary shape, for example, a logotype of a company or a seal of a user as additional information and to record the same.

Furthermore, an additional information recording device provided in the conventional copying machine is constructed to have an ink sheet and a thermal print head. However, a medium-speed or high-speed type copying machine which cannot lower the speed at which paper is conveyed as the disadvantage in that it is difficult to clearly record additional information.

SUMMARY OF THE INVENTION

Therefore, a primary object of the present invention is to provide an image forming apparatus capable of inputting arbitrary additional information including graphic data.

Another object of the present invention is to provide an image forming apparatus capable of clearly recording additional information.

The image forming apparatus according to the present invention has, for example, a scanner for reading arbitrary additional information. Arbitrary data read by the scanner, for example, a particular logotype or seal is recorded as additional data on a recording medium on which a document image is recorded.

Furthermore, in the present invention, an additional information recording device is provided relatively on the downstream side in the direction in which a recording medium is conveyed, Accordingly, the additional information recording device is operated separately from recording of a document image after the recording so that additional information can be clearly recorded at a speed suitable for recording thereof. In addition, the additional information is recorded in the rear end of the recording medium.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A, 4B, 4C and 4D are diagrams each showing which of the mode lamps is turned on or whether no mode lamps are turned on and a concrete example of the content displayed on a liquid crystal multidisplay;

FIG. 9 is a timing chart for explaining an operation of the additional data recording mechanism.

DESCRIPTION OF THE PREFERRED EMBODIMENTS

Figure 1:
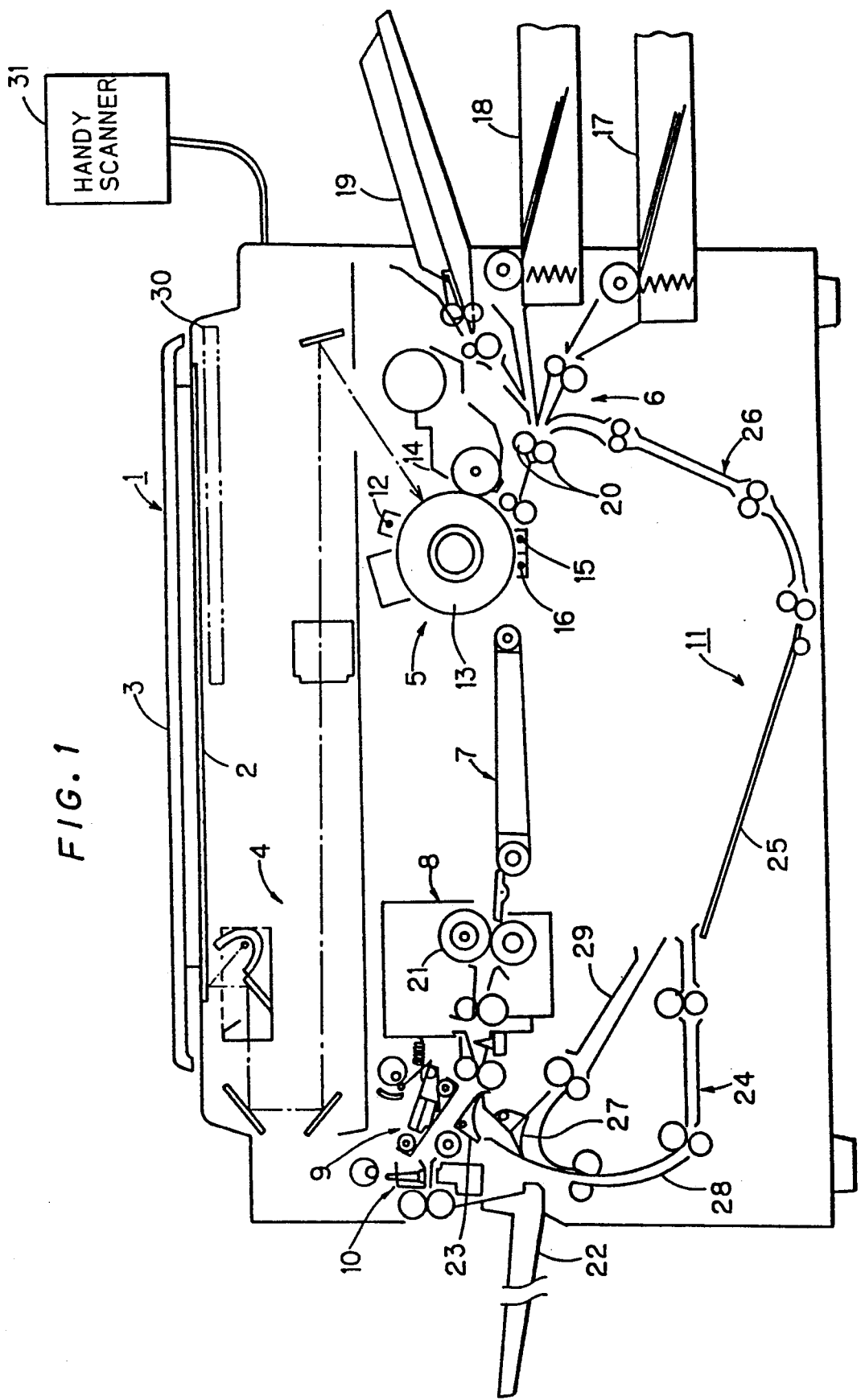
FIG. 1 is an illustration showing the entire construction of a copying machine according to one embodiment of the present invention.

Referring now to the drawings, a preferred embodiment of the present invention will be described in detail.

FIG. 1 is an illustration showing the entire construction of a copying machine according to one embodiment of the present invention. This copying machine is provided with an original glass plate 2 and an original cover 3 on an upper part of its main body 1 and is provided with an optical system 4, an image processing mechanism 5, a paper feeding path 6, a paper conveying path 7, a fixing device 8, an additional data recording mechanism 9, a punching mechanism 10 and a paper refeeding path 11 in its inner part.

The optical system 4 is used for illuminating and scanning a document (not shown) set on the original glass plate 2 and introducing its reflected light into the image processing mechanism 5 as represented by a one dot and dash line in FIG. 1.

The image processing mechanism 5 is used for reproducing a document image by an electrophotographic system. More specifically, the surface of a photosensitive drum 13 is uniformly charged by a charging corona discharger 12 and then, is exposed to the reflected light of the document introduced by the optical system 4, to form an electrostatic latent image corresponding the document image. The electrostatic latent image is developed into a toner image by a developing device 14, the toner image is transferred to the surface of paper by a transferring corona discharger 15, and the paper having the toner image transferred thereto is stripped off from the surface of the photosensitive drum 13 by a separating corona discharger 16.

The paper feeding path 6 is a mechanism for feeding to the photosensitive drum 13 paper to which a toner image is to be transferred and is used for accepting paper one sheet at a time from a paper feeding cassette 17 or 18 or a stacking bypass 19 which is mounted in a predetermined position of the copying machine 1 such that it can be pulled out and feeding the paper to the photosensitive drum 13 by a registration roller 20 at constant timing which is synchronous with an image processing operation of the image processing mechanism 5.

The paper conveying path 7 is used for conveying to the fixing device 8 the paper having the toner image transferred thereto which is stripped from the photosensitive drum 13.

The fixing device 8 comprises a fixing roller 21 and is used for fixing the toner image on the paper by applying pressure to or heating the paper using the fixing roller 21.

The additional data recording mechanism 9 arranged on the downstream side of the fixing device 8 in the direction in which paper is conveyed is used for further recording additional data on the paper having the toner image fixed thereto, that is, the paper on which copying is completed. The detailed construction and operation of this recording mechanism 9 will be described later.

The punching mechanism 10 is provided on the downstream side of the additional data recording mechanism 9 in the direction in which paper is conveyed and can provide a punching hole in paper discharged to a discharge tray 22.

A switching claw 23 is provided at the entrance of the paper refeeding path 11 and is switched depending on whether the paper fed from the fixing device 8 is introduced into the additional data recording mechanism 9 or the paper refeeding path 11. In addition, the paper refeeding path 11 includes a paper reversing-/feeding switching section 24, an intermediate tray 25 and a paper refeeding section 26. The paper reversing-/feeding switching section 24 is switched depending on whether the paper is reversed for copying on the back of paper or the paper is directly fed for composite copying. At the time of reversing the paper, a switching claw 27 is brought into a first state so that the paper is fed once to a first path 28. Thereafter, the switching claw 27 is brought into a second state so that the paper in the first path 28 is fed to the intermediate tray 25 through a second path 29. On the other hand, at the time of composite copying, the switching claw 27 remains in the first state so that the paper introduced into the first path 28 is directly fed to the intermediate tray 25.

The image processing mechanism 5, the paper feeding path 6, the paper conveying path 7, the fixing device 8 and the paper refeeding path 11 in the copying machine are constructed to be driven by a main motor which is not shown in FIG. 1. On the other hand, the additional data recording mechanism 9 and the punching mechanism 10 are so constructed that paper therein is conveyed by a stepping motor different from the main motor. Consequently, the speed at which paper is conveyed in the additional data recording mechanism 9 and the punching mechanism 10 can be changed to an arbitrary speed independently of constant-speed driving of the main motor by changing the speed of the stepping motor with respect to the speed at which paper is conveyed from the paper feeding path 6 to the fixing device 8 and in the paper refeeding path 11.

The main body 1 of the copying machine is further provided with an operation panel 30 on its upper surface. The operation panel 30 is used for, for example, inputting a variety of command signals and setting signals and displaying the contents of an operation.

A detachable handy scanner 31 is further connected to the main body 1 of the copying machine 1. The handy scanner 31 is a device capable of reading arbitrary additional information including image data. The handy scanner 31 includes, for example, a line sensor 64 mm in width capable of reading data and it can read data on 80 lines, that is, data in a region of (one line=64 mm in width)×(80 lines=10 mm in length) in one reading by manual scanning. This type of handy scanner 31 itself is independently commercially available, for example, and is a known part.

One advantage of the present embodiment is that arbitrary image data can be read by the handy scanner 31 and the image data read can be recorded by the additional data recording mechanism 9, as described later.

Figure 2:
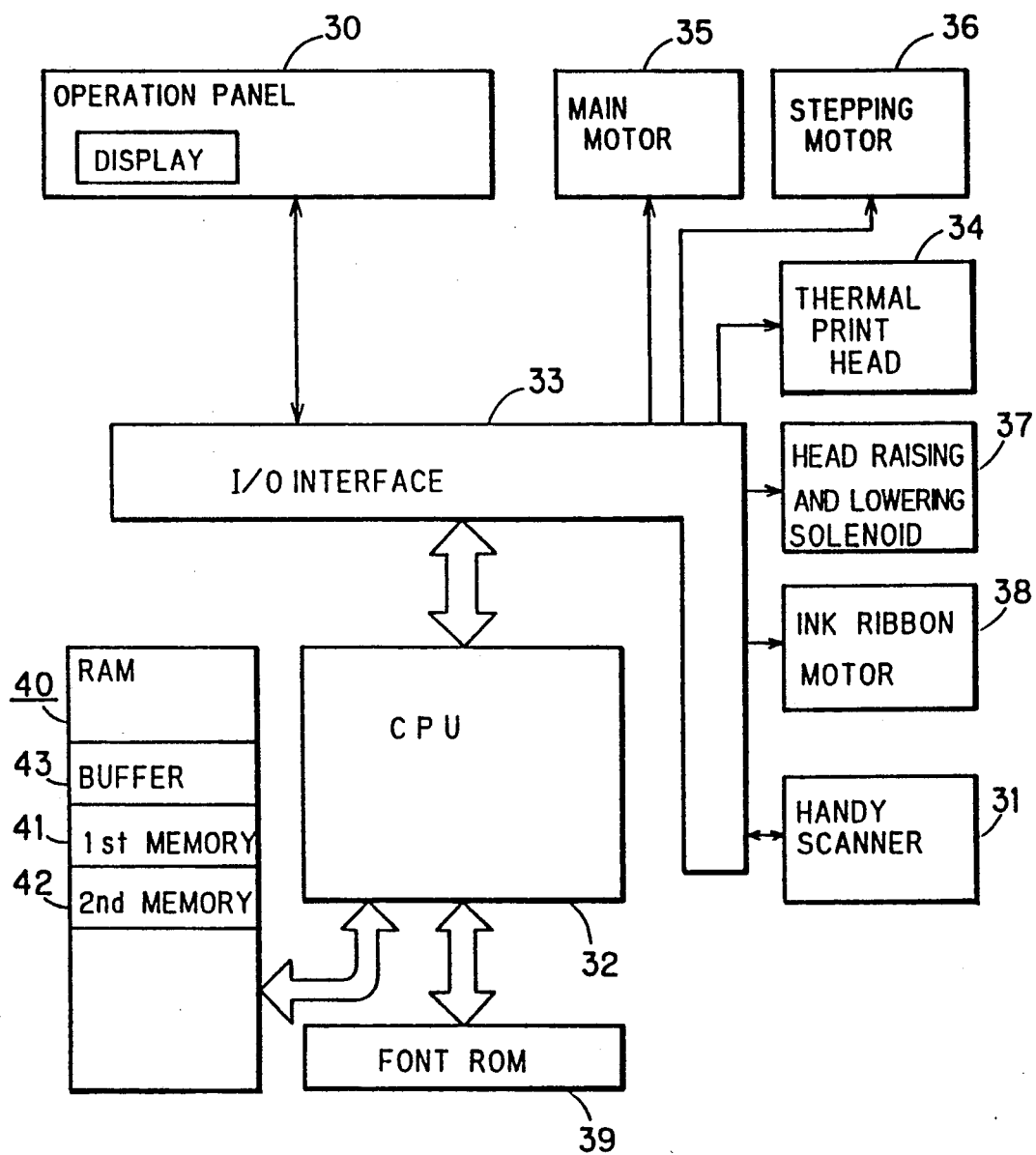
FIG. 2 is a block diagram showing the electrical construction of the copying machine according to one embodiment of the present invention.

FIG. 2 is a block diagram showing the electrical construction of the above described copying machine.

This copying machine comprises a CPU 32 serving as a control center. The operation panel 30, the handy scanner 31, a thermal print head 34, a head raising and lowering solenoid 37 and a ink ribbon motor 38 which are included in the additional data recording mechanism 9, a main motor 35 and a stepping motor 36 are connected to the CPU 32 through an input/output interface 33.

The main motor 35 is used for driving the image processing mechanism 5, the fixing device 8 and the conveying system, on the other hand, the stepping motor 36 is used for driving the additional data recording mechanism 9 and the punching mechanism 10 in the copying machine, as described above.

Furthermore, a variety of driving mechanisms constituting the copying machine is actually connected to the CPU 32 through the input/output interface 33 but are not particularly related to the advantage of the present embodiment and hence, are omitted in FIG. 2.

A font ROM 39 and a RAM 40 are further connected as storing means to the CPU 32. The font ROM 39 is a read-only memory in which character data is previously stored. If particular characters or numerals are recorded by the additional data recording mechanism 9, the particular characters or numerals are read out from this font ROM 39 and are stored in a buffer area 43 in the RAM 40, as described later.

The RAM 40 comprises the buffer area 43, a first memory area 41, and a second memory area 42. The first memory area 41 and the second memory area 42 are areas used in storing data or the like read by the handy scanner 31. The buffer area 43 is an area for storing once the data read by the handy scanner 31 or temporarily storing the data read out from the font ROM 39.

Figure 3A:
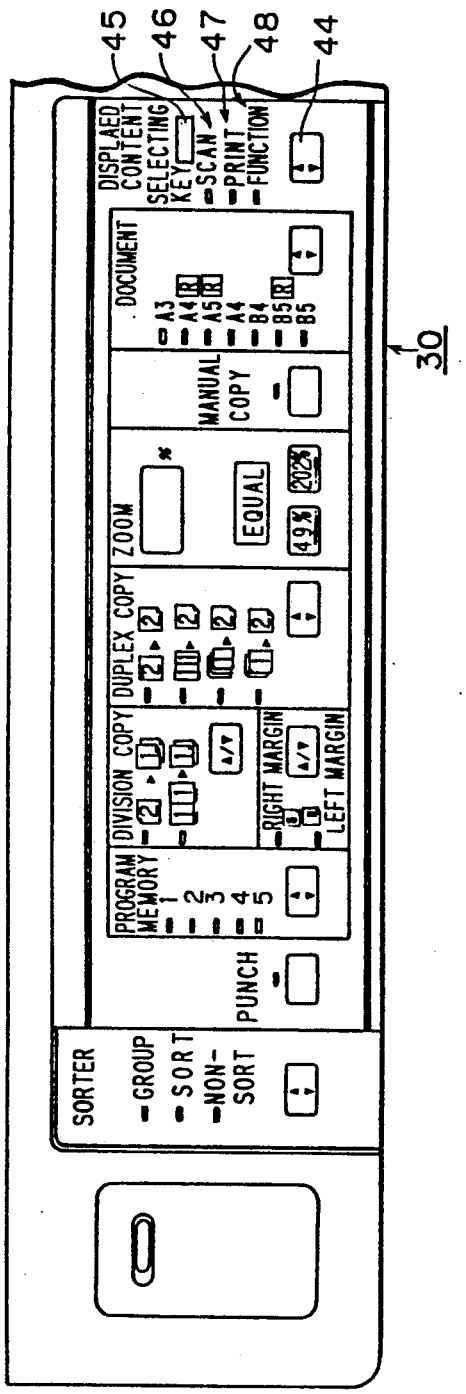
FIGS. 3A and 3B are plan views showing a concrete example of an operation panel of the copying machine according to one embodiment of the present invention.
Figure 3B:
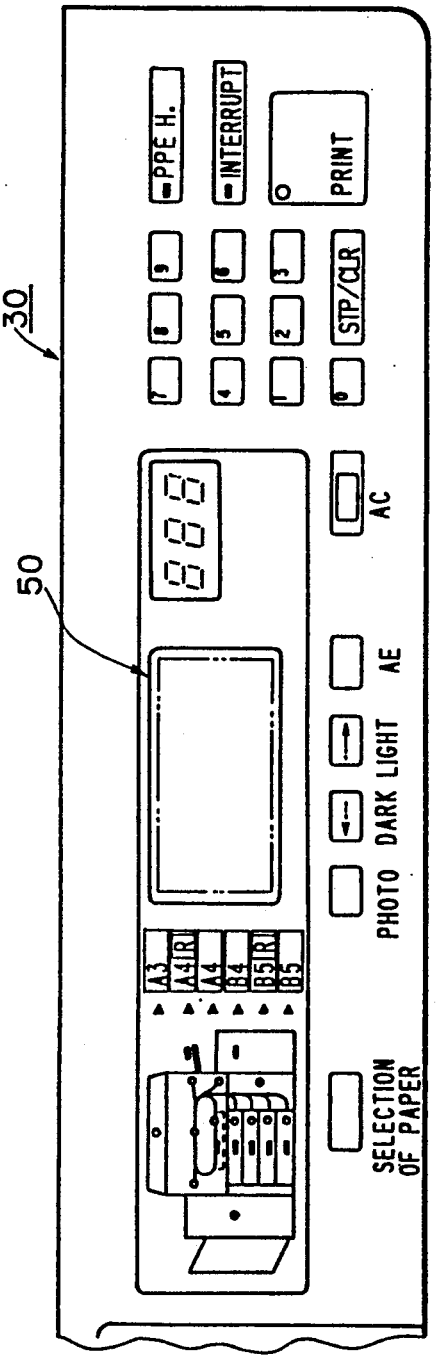

A concrete example of the operation panel 30 is then shown in FIGS. 3A and 3B. FIGS. 3A and 3B are plan views showing one concrete example of the operation panel 30. The actual operation panel 30 has, for example, a long narrow plane shape, the left half and the right half thereof being separately shown in FIGS. 3A and 3B. The operation panel 30 comprises a variety of data setting keys and operation command keys required to operate this copying machine, a display lamp and a display.

Operation keys peculiar to the present embodiment out of the keys comprise a mode selecting key 44 and a displayed content selecting key 45. Every time the mode selecting key 44 is depressed, that is, a signal from the mode selecting key 44 is applied to the CPU 32 (see FIG. 2), an operation mode of the copying machine is switched. It is indicated by mode lamps 46 to 48 which mode is the operation mode. More specifically, a scan mode, a printing mode, a function mode or a normal mode is indicated depending on which of a scan mode lamp 46, a printing mode lamp 47 or a function mode lamp 48 is turned on or whether no mode lamps are turned on.

When a desired mode is selected by the mode selecting key 44, the mode is displayed in a variety of manners as shown in FIGS. 4A, 4B, 4C and 4D by a liquid crystal multidisplay 50.

The foregoing will be concretely explained. In the scan mode, the scan mode lamp 46 is turned on as shown in FIG. 4A, so that the content displayed on the liquid crystal multidisplay 50 becomes that shown in FIG. 4A1. In this state, when the displayed content selecting key 45 is depressed once, the content displayed becomes that shown in FIG. 4A2, that is, data stored in the buffer area 43 in the RAM 40 (see FIG. 2) is displayed. When the displayed content selecting key 45 is further depressed once, the content displayed becomes the content of data stored in the first memory area 41 in the RAM 40, as shown in FIG. 4A3. When the displayed content selecting key 45 is further depressed once, the content displayed becomes the content of data stored in the second memory area 42 in the RAM 40, as shown in FIG. 4A4. When the displayed content selecting key 45 is further depressed once, the content displayed is returned to that shown FIG. 4A1. Thus, the content displayed on the liquid crystal multidisplay 50 is cyclically switched in response to the depression of the displayed content selecting key 45.

Figure 5:
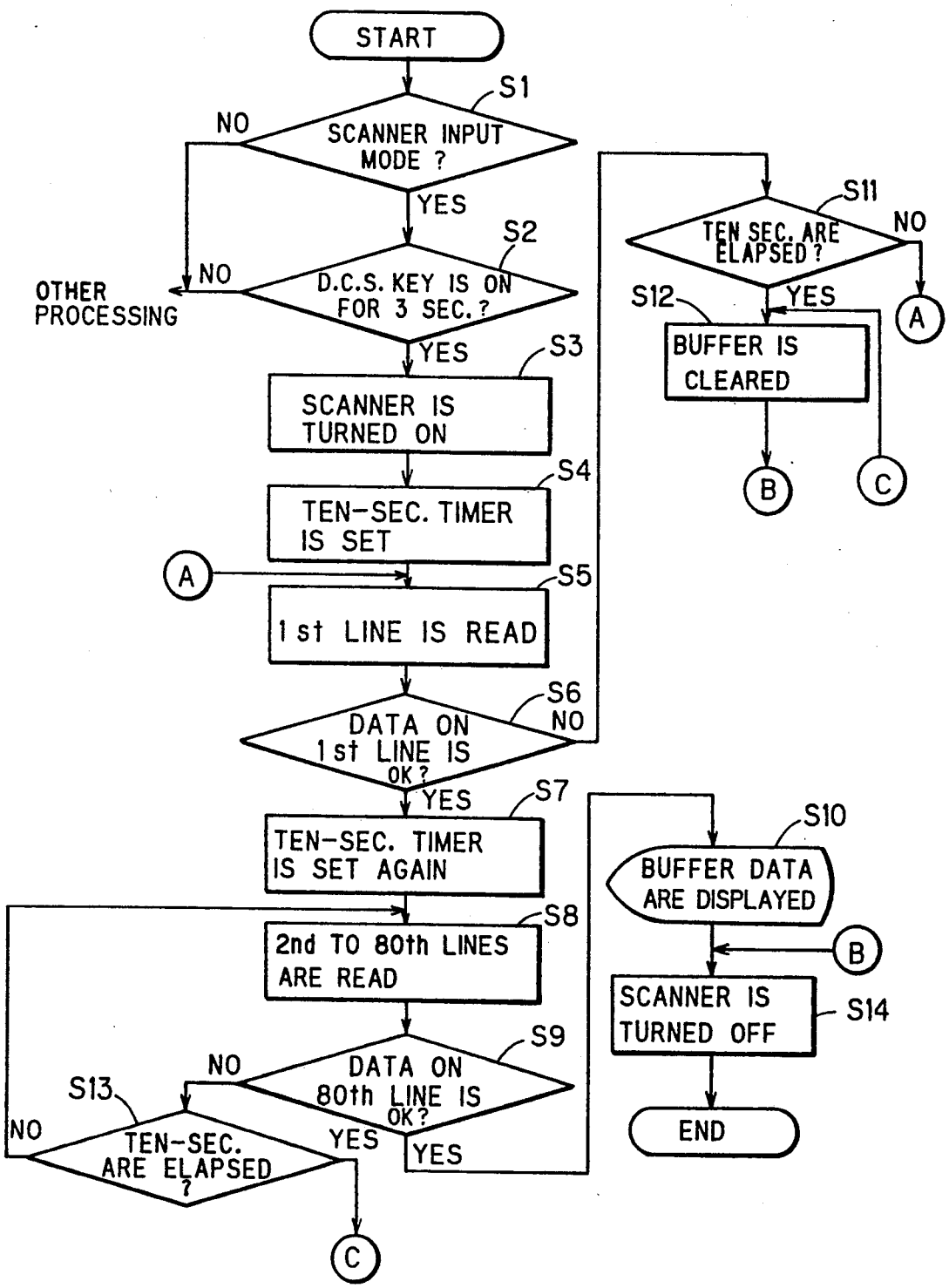
FIG. 5 is a flow chart showing a control operation in a scanner input mode in the copying machine according to one embodiment of the present invention.

In any one of the displayed states, if the displayed content selecting key 45 continues to be depressed continuously for a constant time period, for example, three seconds or more, the content displayed becomes that as shown in FIG. 4A5, so that the handy scanner 31 (see FIG. 1) is turned on, thereby to make it possible to read data by the handy scanner 31.

Figure 6:
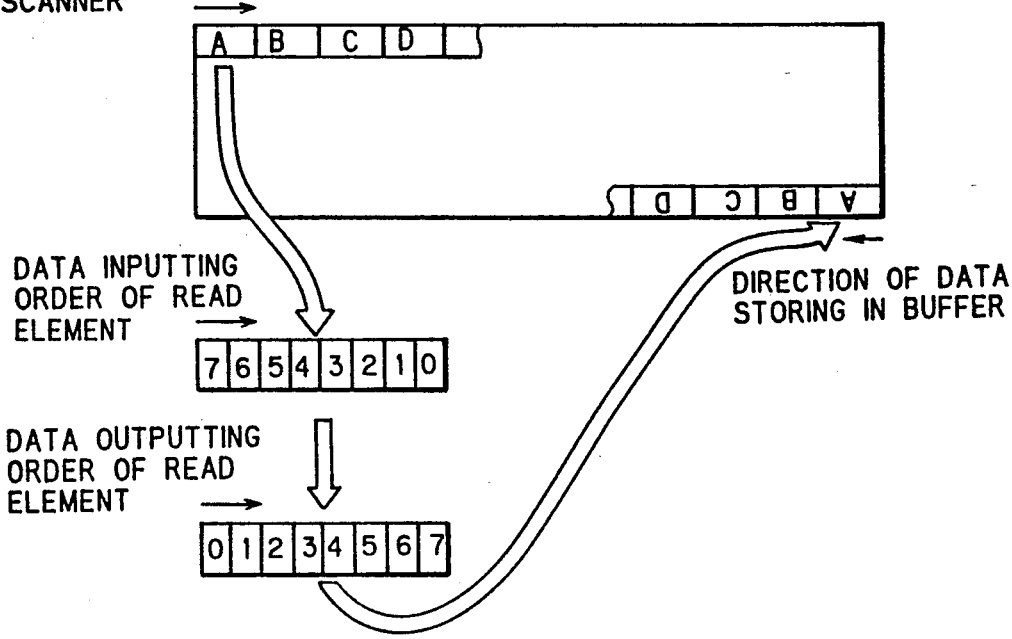
FIG. 6 is an illustration for explaining a data inverting method in a case where data read by a scanner is stored in a memory.

In the printing mode, the printing mode lamp 47 is turned on as shown in FIG. 4B, so that the content displayed on the liquid crystal multidisplay 50 becomes that shown in any one of FIGS. 4B1 to 4B6. Also in this mode, the content displayed is cyclically switched to those shown FIG. 4B1, FIG. 4B2, FIG. 4B3, FIG. 4B4, FIG. 4B5, FIG. 4B6 and FIG. 4B1 by the depression of the displayed content selecting key 45. Characters, for example, "CIRCULATION", "REFERENCE", "IMPORTANCE", "URGENT CIRCULATION", "SECRET OUTSIDE COMPANY" and "INHIBITION OF COPY" displayed on the liquid crystal multidisplay 50 in this mode are additional data read out from the font ROM 39 and stored in the buffer area 43.

The data previously recorded in the font ROM 39 are not limited to the above described six types of data. For example, other data may be recorded. In addition, the number of data may be larger than that in the present embodiment.

In the function mode, the function mode lamp 48 is turned on as shown in FIG. 4C, so that the content displayed on the liquid crystal multidisplay 50 becomes that as shown in FIG. 4C1 or 4C2. More specifically, date data is stored as additional data in the buffer area 43 and is displayed. For example, the Christian era or the name of the era can be selected in displaying the date data. The content displayed can be cyclically switched in response to an operation of the displayed content selecting key 45 in the above described manner. In addition, time data may be displayed in place of the date data.

In the normal mode, any one of the three mode lamps 46 to 48 is not turned on as shown in FIG. 4D, so that the content displayed on the liquid crystal multidisplay 50 becomes that shown in FIG. 4D1.

Meanwhile, the other operation keys and display sections in the operation panel 30 shown in FIGS. 3A and 3B are not directly related to the construction which characterizes the present embodiment and hence, the description thereof is omitted herein.

Description is now made of a control operation carried out when the content displayed on the liquid crystal multidisplay 50 becomes that as shown in FIG. 4A5, so that the handy scanner 31 is turned on, to make it possible to read data.

FIG. 5 is a flow chart showing a control operation of the CPU 32 (see FIG. 2) in a scanner input mode in which data can be read by the handy scanner 31.

Description is made with reference to FIGS. 2 and 5. In the scanner input mode (Step S1), if it is determined that the displayed content selecting key 45 continues to be on for a predetermined time period, for example, three seconds or more (step S2), the handy scanner 31 is turned on (step S3), thereby to make it possible to read data by the handy scanner 31. A ten-second timer is set on a program (step S4).

When data is read by the handy scanner 31, the data is stored in the buffer area 43 in the RAM 40 (step S5), and it is determined whether or not data on the first line is normally inputted (step S6).

If the data on the first line is not normally inputted for ten seconds elapsed until the ten-second timer reaches the full count (step S11), the buffer area 43 is cleared (step S12), and the handy scanner 31 is turned off (step S14), to terminate the scanner input mode.

If it is determined in the step S6 that the data on the first line was normally inputted, the ten-second timer is set again by the CPU 32 (step S7). If data on the second to eightieth lines are read by the handy scanner 31 (step S8), the data are stored in the buffer area 43 (step S9). During this time period, it is determined whether or not the ten-second timer reaches the full count (step S13). If the data on the second to eightieth lines are not precisely inputted within ten seconds, the buffer area 43 is cleared (step S12), and the handy scanner 31 is turned off (step S14), to terminate the scanner input mode.

If the data on the second to the eightieth lines have been precisely inputted after the data on the first line was inputted (YES in step S9), the data stored in the buffer area 43 are displayed on the liquid crystal multidisplay 50 (step S10), and the handy scanner 31 is turned off (step S14), to terminate the scanner input mode.

The copying machine according to the present embodiment is adapted such that the scanner input mode is started when the displayed content selecting key 45 is continuously turned on for a constant time period (three seconds in the present embodiment) or more and the scanner input mode is released when data is not read for a constant time period (ten seconds in the present embodiment) or more, as described above. This is because in the present embodiment, the single CPU 32 controls both the entire copying machine and data reading by the handy scanner 31. Consequently, in reading data by the handy scanner 31, the main body 1 of the copying machine cannot be controlled. Accordingly, the scanner input mode is prevented from being easily started and the scanner input mode is released by the elapse of a constant time period even if it has been started, to carry out inherent control of the copying machine.

If image data reading means for reading additional data is constituted by a handy scanner as in the present embodiment, data can be easily read and desired data can be simply inputted as additional data.

FIG. 6 is an illustration showing a state where the direction of data read by the handy scanner 31 is reversed in storing the read data in the buffer area 43.

More specifically, in the case of data reading processing in the steps S5 and S8 in the flow chart shown in FIG. 5, the direction of the read data is reversed as described below.

The handy scanner 31 comprises the line sensor as described above, the line sensor comprising 512 bits = 8-bit element × 64. More specifically, the line sensor in the handy scanner 31 is so constructed that 64 read elements are aligned. Data red by this line sensor is stored in the buffer area 43 in a first-in first-out order for each read element and the direction of the read data is reversed in storing the data.

If the direction of the data read by the handy scanner 71 is thus reversed in storing the data in the buffer area 43, the direction of the data stored in the buffer area 43 can be reversed in printing the data. If the data read by the handy scanner 31 is stored in the buffer area 43 in the usual method, the data appears upside down when it is printed. In the present embodiment, therefore, the direction of the data read by the handy scanner 31 is reversed in storing the data.

Figure 7A:
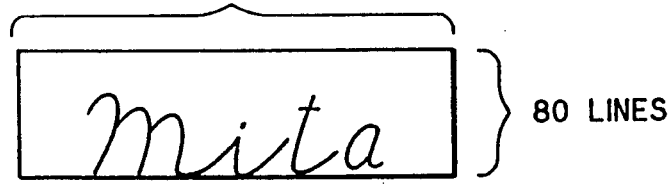
FIGS. 7A, 7B and 7C are illustrations for explaining a method used in displaying memory data.
Figure 7B:

FIG. 7A shows the storage capacity of the buffer area 43, FIG. 7B shows the display capacity of the liquid crystal multidisplay 50. In addition, FIG. 7C is an illustration showing the procedure of reading data in a case where data stored in the buffer area 43 is displayed on the liquid crystal multidisplay 50.

More specifically, the following data compression processing is performed in a case where data stored in the buffer area 43 is displayed on the liquid crystal multidisplay 50 in the step S10 in the flow chart shown in FIG. 5.

The buffer area 43 can store at least data on 80 lines with data on one line comprising 512 bits as shown in FIG. 7A, while the liquid crystal multidisplay 50 can display, for example, only data on 20 lines with data on one line comprising 128 bits as shown in FIG. 7B.

Figure 7C:
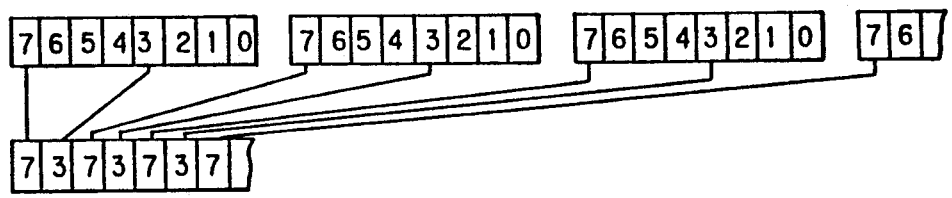

In the present embodiment, as shown in FIG. 7C, only the 7th-bit data and the 3rd-bit data of each of 64 sets of data arranged in units of eight bits on one line are read out to perform data compression in the line direction, and line data are intermittently read out at four-line spacing, for example, the first line, the fifth line, the ninth line, the thirteenth line, in the line direction to perform data compression.

As a result, data stored in the buffer area 43 having relatively large storage capacity can be analogously reduced and the reduced data can be displayed on the liquid crystal multidisplay 50 having relatively small display capacity.

More specifically, even if the display capacity of a display is relatively smaller than the read capacity of an image data reading device for reading additional data, the read data can be displayed on the display without any interference. Consequently, the copying machine can be made an easy-to-use apparatus capable of confirming the additional data read using the display.

Although in the present embodiment, stored data is reduced by one-fourth and displayed as described above, the stored data need not be reduced if the storage capacity of the buffer area 43 and the display capacity of the liquid crystal multidisplay 50 are equal to each other, otherwise it may be reduced depending on the ratio of the storage capacity to the display capacity.

Description is now made of the construction and operation for recording additional data stored in the buffer area 43 on paper by the additional data recording mechanism 9 including the thermal print head 43.

Figure 8A:
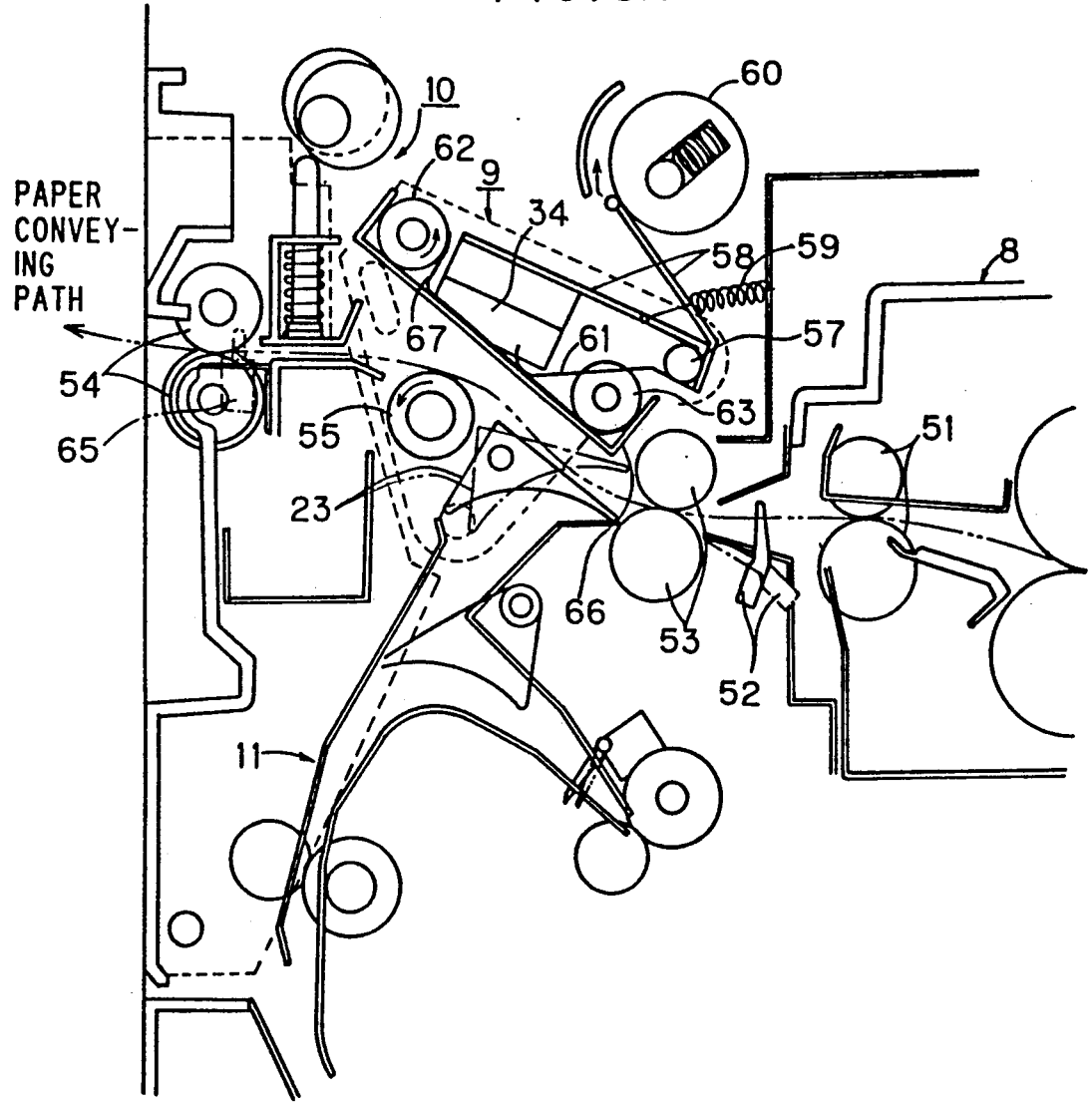
FIGS. 8A and 8B are cross sectional views showing an example of the detailed construction of an additional data recording mechanism.
Figure 8B:
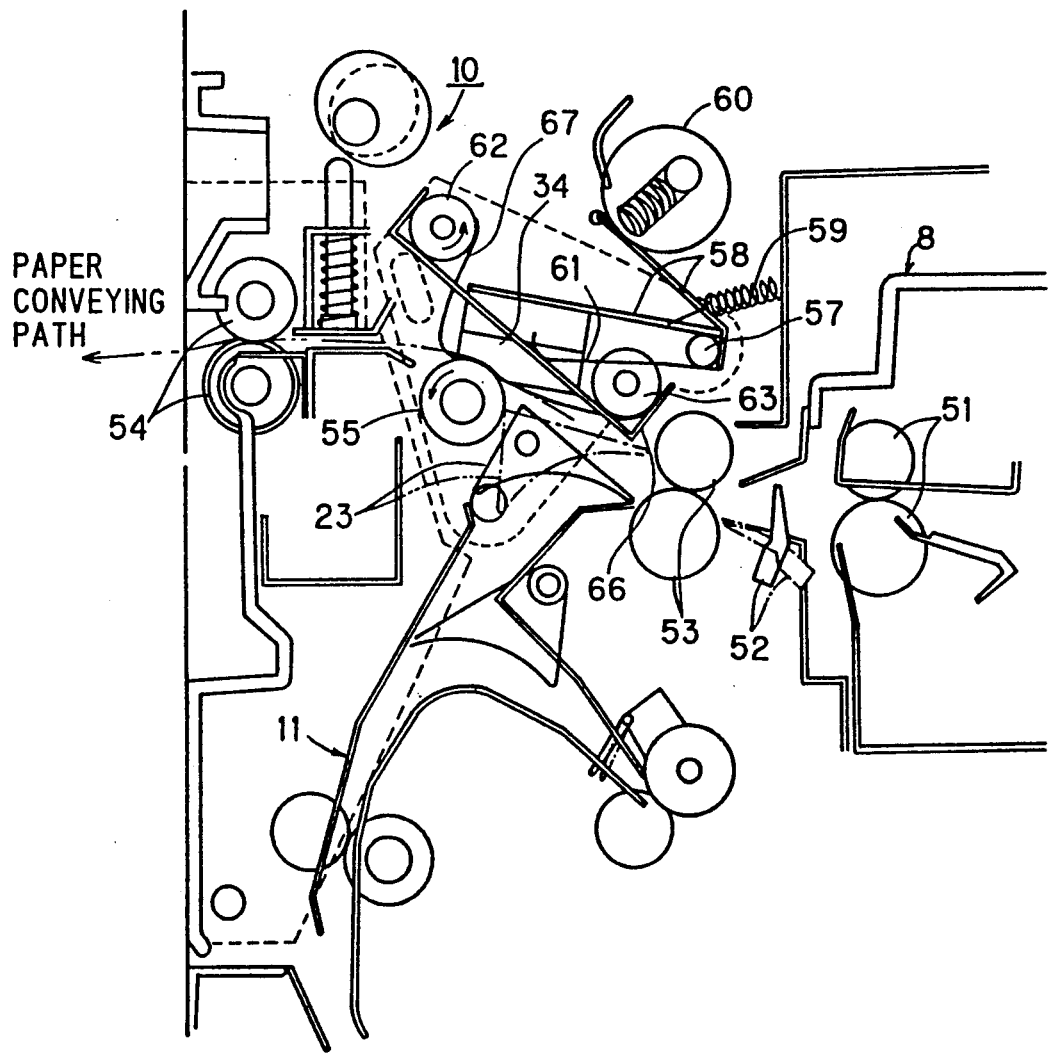

FIGS. 8A and 8B are cross sectional views showing diagrammatically an example of the more detailed construction of the additional data recording mechanism 9 according to the present embodiment, where FIG. 8A shows a case where the additional data recording mechanism 9 is in an inactive state and FIG. 8B shows a case where the additional data recording mechanism 9 is in an active state.

In FIGS. 8A and 8B, a discharge roller 51 is arranged at the exit of a fixing device 8, and a fixing completion detecting switch 52 is provided on the downstream side of the fixing device 8 in the direction in which paper is conveyed. This detecting switch 52 is a switch which is changed to a state represented by a one dot and dash line from a state represented by a solid line to enter the on state when the front end of paper is discharged from the discharge roller 51, while being returned to the state represented by the solid line to enter the off state as soon as the rear end of the paper has finished passing on the detecting switch 52. Consequently, the rear edge of the paper can be detected by detecting an edge at which this fixing completion detecting switch 52 is changed from the on state to the off state.

The paper discharged from the discharge roller 51 is fed to the downstream side in the direction of conveyance by a delivery roller 53. The switching claw 23 is provided in close proximity to the delivery roller 53 on the downstream side of the delivery roller 53. The switching claw 23 is used for introducing the paper into a discharge roller 54 in the state represented by a solid line, while introducing the paper into a paper refeeding path 11 in the state represented by a one dot and dash line, as already described.

The additional data recording mechanism 9 and the punching mechanism 10 are provided in that order in a path through which the paper introduced into the discharge roller 54 by the switching claw 23 passes.

The additional data recording mechanism 9 comprises a platen roller 55 arranged on the paper conveying path and a thermal print head 34 which can be raised and lowered. The thermal print head 34 can be displayed to a state where it is raised from the platen roller 55 as shown in FIG. 8A and to a lowered state where its head line abuts on a peripheral surface of the platen roller 55 as shown in FIG. 8B.

More specifically, there is provided an attaching member 58 rotatably around a supporting shaft 57, and the thermal print head 34 is attached to this attaching member 58. The attaching member 58 generally experiences the clockwise moment in FIGS. 8A and 8B by the force of a plate spring 61 because the plate spring 61 abuts on a casing 66 in the additional data recording mechanism 9. In addition, the force of a return spring 59 complimentarily functions as the clockwise moment. As a result, the thermal print head 34 waits in a position raised from the platen roller 55. A cam 60 is also engaged with the attaching member 58. The cam 60 is adapted to be reversed by a head raising and lowering solenoid (not shown) and rotates the attaching member 58 in the counterclockwise direction as shown in FIG. 8B if it is reversed. Consequently, the thermal print head 34 is lowered against the force of the plate spring 61 and abuts on the peripheral surface of the platen roller 55. When the thermal print head 34 abuts on the peripheral surface of the platen roller 55, the abutting force is kept constant by the function of the plate spring 61.

The additional data recording mechanism 9 further comprises a pair of ribbon pulleys 62 and 63. An ink ribbon 67 is stretched between the ribbon pulleys 62 and 63. The ink ribbon 67 covers the head line of the thermal print head 34. Accordingly, the additional data recording mechanism 9 is so constructed that the ink ribbon 67 abuts on the head line of the thermal print head 34 when the thermal print head 34 abuts on the peripheral surface of the platen roller 55 as shown in FIG. 8B, and ink of the ink ribbon 67 is moved to the side of the platen roller 55, that is, paper when the thermal print head 34 is driven.

Meanwhile, it is preferable that the ink ribbon 67 is in a color different from that in which a document image is recorded, for example, red if the document image is recorded in, for example, black. It is needless to say that the ink ribbon 67 of the same color as that of the document image may be used.

Although in the present embodiment, the cam 60 is rotated by 180° by a head raising or lowering solenoid (not shown), thereby to raise and lower the thermal print head 34, the thermal print head 34 may be directly raised and lowered by the solenoid.

Furthermore, the cam 60 may be rotated by a motor.

Additionally, the additional data recording mechanism 9 may be so constructed that the thermal print head 34 is fixed on the paper conveying path and the platen roller 55 is raised and lowered.

FIG. 9 is a timing chart for explaining a control operation of the additional data recording mechanism 9. Referring now to FIGS. 8A, 8B and 9, the control operation of the additional data recording mechanism 9 will be described.

The delivery roller 53, the discharge roller 54 and the platen roller 55 are driven by the stepping motor 36 (see FIG. 2), as described above. As a result, the rotational speeds of the rollers 53, 54 and 55 can be set to arbitrary speeds unlike the discharge roller 51 in the fixing device 8 driven by the main motor 35.

In the inactive state where the thermal print head 34 waits as shown in FIG. 8A, paper discharged from the fixing device 8 must be directly conveyed in the direction of discharge without being slack and pulled. Accordingly, when the additional data recording mechanism 9 is in the inactive state, the delivery roller 53, the discharge roller 54 and the platen roller 55 are rotated at, for example, 300 mm/sec by the stepping motor 36. This speed is equal to the speed at which paper is conveyed by the main motor 35.

When the paper is discharged from the fixing device 8 and the rear end of the paper finishes passing through the fixing completion detecting switch 52, the detecting switch 52 is switched from the on state to the off state. The stepping motor 36 is stopped after a constant time period, i.e., t seconds from the detection of an edge at which this detecting switch 52 is turned off. When the stepping motor 36 is stopped, the rear end of the paper is in a predetermined position, for example a position spaced tens of millimeters apart on the upstream side of the platen roller 55. After an elapse of 100 milliseconds since the stepping motor 36 was stopped, the head raising or lowering solenoid 37 (see FIG. 2) is turned on and the ink ribbon motor 38 (see FIG. 2) is started. Consequently, the additional data recording mechanism 9 enters the active state. In this case, there exist the rear end of the paper and the ink ribbon 67 between the thermal print head 34 and the platen roller 55.

After the head raising and lowering solenoid 37 is turned on, for example, after an elapse of 300 milliseconds, the stepping motor 36 is driven by one step, stopped for a very short time period and driven by one step, until it is intermittently driven by 80 steps in total. Additional data on one line is sequentially recorded by the thermal print head 34 every time the stepping motor 36 is stopped for a very short time period. Thus, if the stepping motor 36 is stopped for each line to record additional data by the thermal print head 34, the content of the additional data can be clearly recorded.

Furthermore, additional data is recorded in the rear end of paper on which copying is completed. Accordingly, a part of the paper does not remain within the fixing device 8, so that there is no possibility of deforming and scorching a part of the paper.

The stepping motor 36 is stopped once after it is operated by 80 steps, and the head raising and lowering solenoid 37 is turned off. Accordingly, the thermal print head 34 is raised by the forces of the plate spring 61 and the return spring 59. Since the ink ribbon motor 38 continues to be rotated for, for example, 200 milliseconds while and after the thermal print head 34 is raised, the ink ribbon 67 delivered at the time of printing is smoothly wound, so that the ink ribbon 67 does not remain affixed to the paper and there is no useless slack in the ink ribbon 67.

The stepping motor 36 is rotated at a constant speed for a constant time period after it is stopped for 200 milliseconds. Consequently, the paper having additional data recorded in its read end is discharged from the discharge roller 54 to the discharge tray 22 (see FIG. 1).

Thereafter, the speed of the stepping motor 36 is returned to the original speed, that is, the same speed as that of the main motor 35 with a speed of 300 mm/sec in the case of continuous copying, while the stepping motor 36 is stopped in the case of single copying.

Although in the present embodiment, the fixing completion detecting switch 52 is provided in a discharge section of the fixing device 8 and the rear end of paper is detected on the basis of the edge at which the detecting switch is switched from the on state to the off state to carry out control such that the position where additional data is recorded becomes a desired position, the rear end of the paper may be detected on the basis of not the fixing completion detecting switch 52 but a registration switch provided in the position of the registration roller 20 (see FIG. 1) to determine the position where additional data is recorded.

Furthermore, in a case where a discharge confirming switch 65 (see FIG. 8A) is provided in connection with the discharge roller 54, if the size of paper becomes clear, the position where additional data is recorded may be determined after the front end of the paper is detected by this discharge confirming switch 65 on the basis of the detection.

Additionally, the distance from the registration roller 20 to the additional data recording mechanism 9 is constant. Accordingly, if the size of paper is found, timing of recording additional data is controlled on the basis of timing of paper feeding by the registration roller 20, to make it possible to record additional data in a desired position of the paper. More specifically, even if paper is not detected by a particular paper detecting switch, the position of the paper can be found on an operation, thereby to make it possible to control the position where additional data is recorded.

Description was mainly made of the case of normal simplex copying. In the case of duplex copying or composite copying, however, additional data is recorded immediately before paper on which duplex copying or composite copying is completed is discharged to the discharge tray 22.

Figure 10A:
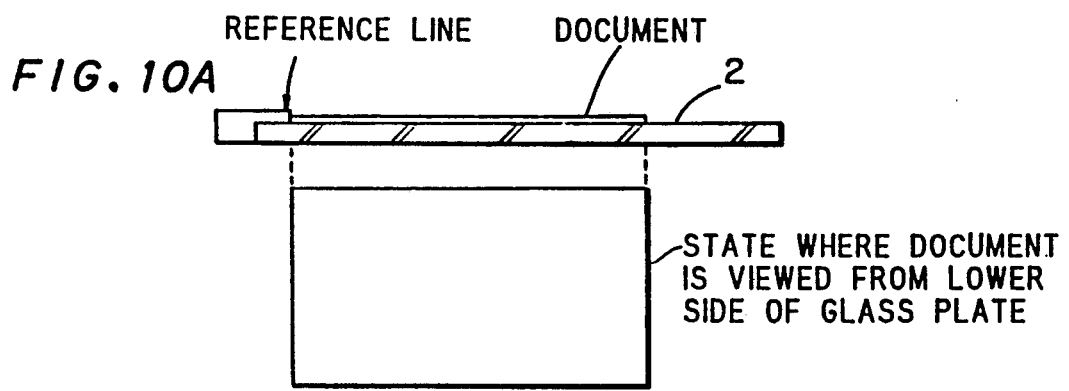
FIGS. 10 and 11 are diagrams showing the corresponding relation between paper on which copying is completed and additional data is further recorded according to the present embodiment and a document.
Figure 10B:
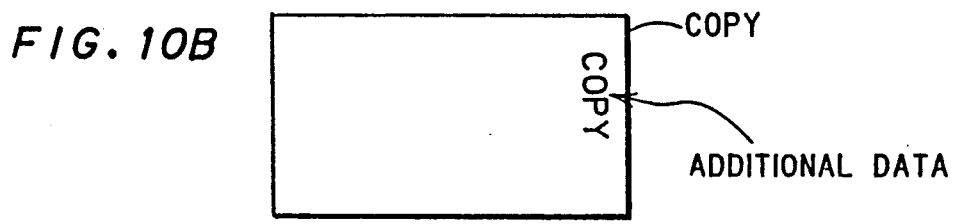

FIGS. 10A, 10B, 11A and 11B show the corresponding relation between a state where a document is set on the original glass plate 2 and paper on which copying is completed and additional data is further recorded. It is generally preferable that additional data is recorded in an upper end or a lower end of the document. In the present embodiment, if the additional data is recorded in the upper end of the document, the document is set such that its rear edge conforms to a reference line of the original glass plate 2 to copy the document as shown in FIG. 10A, the additional data is recorded in the upper end of a document image on the paper on which copying is completed as shown in FIG. 10B. As obvious from FIG. 10B, the top and bottom direction of the additional data coincides with that of the document image. This is because the direction of data read by the handy scanner 31 is reversed in storing the data in the buffer area 43, as described above.

Figure 11A:
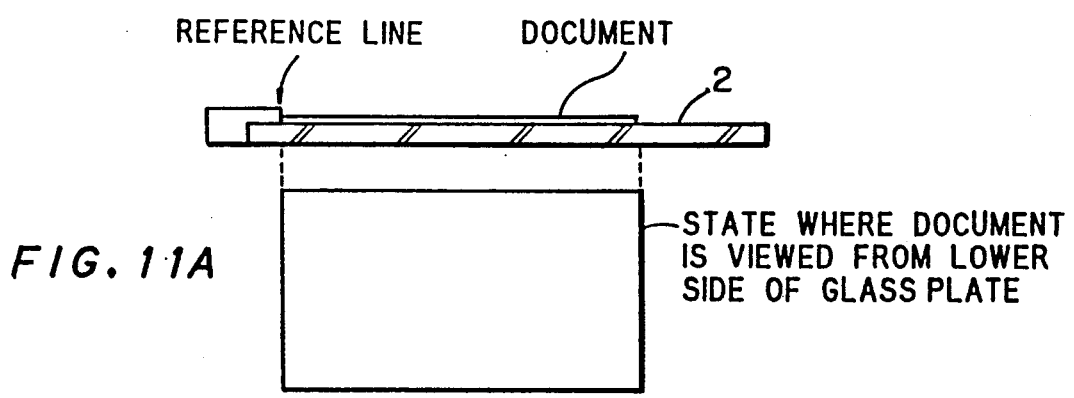
Figure 11B:
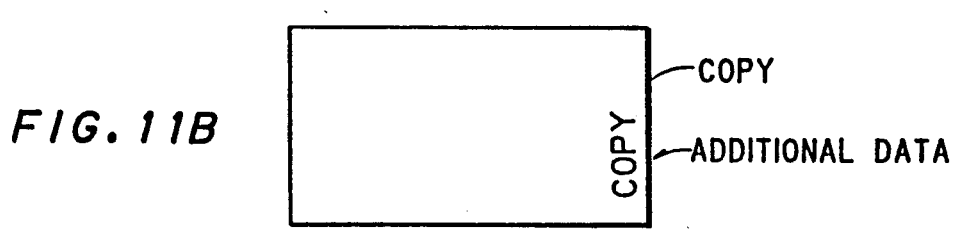

On the other hand, if additional data is recorded in the lower end of the paper on which copying is completed, the document may be set such that its front edge conforms to the reference line of the original glass plate 2 to copy the document as shown in FIG. 11A. In such a case, the direction of the data read by the handy scanner 31 is not reversed in storing the data in the buffer area 43. Consequently, the top and bottom direction of the additional data is the same as that of the document image, as shown in FIG. 11B.

As described in the foregoing, according to the present embodiment, the direction in which additional data is recorded is controlled such that the top and bottom direction of the document image coincides with the top and bottom direction of the additional data in recording the additional data. Accordingly, a finished recording medium is nice to look at and is easy to read.

Meanwhile, in not only a case where data read by the handy scanner 31 is stored in the buffer area 43 but also a case where data in the font ROM 39 is read out and stored in the buffer area 43, the direction of the data may be reversed in storing the data, if required.

Additionally, there may be provided a selecting switch (not shown) switchable depending on whether or not data is reversed in storing the data in the buffer area 43. It is preferable that this switch is a switch also used as a selecting switch switched depending on whether additional data is recorded in an upper end or a lower end of paper.

As described in the foregoing, according to the present embodiment, if an additional image is recorded along with the document image, the additional image can be recorded in a suitable position in the recording medium.

In particular, when the additional image is recorded in the rear end of the recording medium, the recording medium is not discolored by heat or the like of the fixing device included in document image recording means.

Furthermore, additional image recording means can be arranged in the vicinity of the document image recording means, so that the entire copying machine is not made large in size.

Moreover, the additional image can be recorded substantially clearly because it can be recorded at a particular speed.

Additionally, if the additional image recording means is separated from the recording medium after the additional image is recorded, the recording medium can be conveyed relatively quickly. In the case, there is no possibility that the recording medium becomes dirty by the adhesion of the ink ribbon or the like to the recording medium.

Although in the above described embodiment, description was made by taking a copying machine as an example, it should be noted that the present invention can be similarly applied to an image forming apparatus such as a printer or a facsimile.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   conveying means for conveying a sheet-shaped recording medium from a location in a predetermined conveying direction;
   image transforming means arranged downstream of said location for reading an image of a document disposed at an original setting place, then forming and transferring a toner image corresponding to the document image read onto the sheet-shaped recording medium;
   fixing means for fixing by heat the toner image transferred onto the sheet-shaped recording medium, said fixing means being arranged downstream of said transferring means in the conveying direction;
   image data reading means capable of reading arbitrary image data other than said document image; and
   additional data recording means for recording the image data read by said image data reading means as additional data on the recording medium on which the toner image is transferred and fixed, said additional data recording means being arranged downstream of said fixing means in the conveying direction;
   activating signal outputting means for outputting an activating signal at a predetermined time after conveyance of a rear end of the sheet-shaped recording medium from said fixing device in the conveying direction;
   control means for operating said additional data recording means in response to said activating signal; and a housing for housing said conveying means, said image transferring means, said fixing means, said image data reading means, said additional data recording means, said outputting means, and said control means and, forming an outside frame for said apparatus.

2. The image forming apparatus according to claim 1, wherein said image data reading means is provided detachably from a main body of said apparatus.

3. The image forming apparatus according to claim 2, wherein said image data reading means comprises a handy scanner.

4. The image forming apparatus according to claim 3, which further comprises:
   read mode setting means for outputting a read mode setting signal to bring said image data reading means into an operable state;
   first timer means which is started in response to an output signal of said read mode setting means for outputting a time-up signal after a predetermined first time period;
   determining means for determining whether or not read data is applied from said image data reading means before a time-up signal of said first timer means is outputted; and
   read mode releasing means for releasing a read mode to bring said image data reading means into a nonoperable state if said determining means determines that no read data is applied.

5. The image forming apparatus according to claim 4, which further comprises:
   second timer means which is started in response to the application of the read data from said image data reading means for outputting a time-up signal after a predetermined second time period; and
   read mode terminating means for terminating the read mode in response to the time-up signal of said second timer means to bring said image data reading means into a nonoperable state.

6. The image forming apparatus according to claim 1, which further comprises:
   display means for displaying image data read by said image data reading means; and
   data compressing means for compressing the data read by said image data reading means to apply the same to said display means.

7. The image forming apparatus according to claim 1, wherein said additional data recording means is adapted such that at least a part thereof can be displaced to a first position where additional data can be recorded or a second position where additional data cannot be recorded.

8. The image forming apparatus according to claim 7, which comprises:
   conveyance stopping means for stopping once the conveyance of said sheet-shaped recording medium when the recording means is conveyed to a predetermined position with respect to said additional data recording means;
   activating means for displacing said additional data recording means to the first position where additional data can be recorded after the conveyance of said recording medium is stopped by the conveyance stopping means; and
   first conveying speed control means for conveying said sheet-shaped recording medium at a predetermined first speed after said activating means is operated.

9. The image forming apparatus according to claim 8, which further comprises:
   second conveyance stopping means for stopping once the conveyance of said sheet-shaped recording medium in response to the completion of recording of the additional data;
   inactivating means for displacing said additional data recording means to the second position where additional data cannot be recorded after the conveyance of said recording medium is stopped by the second conveyance stopping means; and
   second conveying speed control means for conveying said sheet-shaped recording medium at a second speed relatively higher than the first speed at the time of recording the additional data after said inactivating means is operated.

10. The image forming apparatus according to claim 1, which further comprises:
    an operation switch which can be changed from representing a normal direction to representing an opposite direction by a manual operation; and
    order reversing means for reversing the order of outputting of data in the normal direction or in the opposite direction in response to whether the operation switch is representing the normal direction or the opposite direction as image data read by said image data reading means is outputted to said additional data recording means.

11. The image forming apparatus according to claim 1, wherein detecting means is provided adjacent to a conveying out portion of said fixing means,
    said activating signal output means outputting its activating signal based upon when said detecting means detects the rear end of the sheet-shaped recording medium as the medium is conveyed from said fixing means.

12. The image forming apparatus according to claim 1, which is provided with resisting means for controlling timing of when the sheet-shaped recording medium is supplied to said image transferring means,
    said activating signal output means outputting an activating signal based on the supplying timing controlled by said resisting means.

* * * * *